US009062210B2

(12) United States Patent
Lee (10) Patent No.: US 9,062,210 B2
(45) Date of Patent: Jun. 23, 2015

(54) COMPOSITIONS AND METHODS FOR MAKING GLASS FORTIFIED WOOD

(75) Inventor: Kwangyeol Lee, Bellevue, WA (US)

(73) Assignee: Empire Technology Development LLC, Wilmington, DE (US)

(*) Notice: Subject to any disclaimer, the term of this patent is extended or adjusted under 35 U.S.C. 154(b) by 308 days.

(21) Appl. No.: 13/383,794

(22) PCT Filed: Jul. 20, 2011

(86) PCT No.: PCT/US2011/044660
§ 371 (c)(1),
(2), (4) Date: Jan. 12, 2012

(87) PCT Pub. No.: WO2013/012421
PCT Pub. Date: Jan. 24, 2013

(65) Prior Publication Data
US 2013/0022822 A1    Jan. 24, 2013

(51) Int. Cl.
*C09D 5/14*    (2006.01)
*C09D 1/00*    (2006.01)
*C09D 15/00*   (2006.01)
*B05D 7/08*    (2006.01)
*B27K 3/08*    (2006.01)
*B27K 3/15*    (2006.01)
*B27K 3/34*    (2006.01)
*B05D 3/10*    (2006.01)

(52) U.S. Cl.
CPC .... *C09D 1/00* (2013.01); *C09D 15/00* (2013.01); *B27K 3/086* (2013.01); *B27K 3/156* (2013.01); *B27K 3/346* (2013.01); *B05D 3/104* (2013.01); *B05D 7/08* (2013.01)

(58) Field of Classification Search
USPC ............... 428/537.1, 438; 427/325, 301, 344; 106/15.05, 18.35, 287.1
IPC ...... C09D 5/14,5/16, 1/00, 15/00; B32B 17/06; B05D 3/00, 7/08
See application file for complete search history.

(56) References Cited

U.S. PATENT DOCUMENTS

| | | | |
|---|---|---|---|
| RE21,935 E | * | 11/1941 | Goff et al. .................. 536/74 |
| 3,660,321 A | | 5/1972 | Praetzel et al. |
| 4,017,457 A | | 4/1977 | Baron et al. |
| 4,328,136 A | | 5/1982 | Blount |
| 4,329,882 A | * | 5/1982 | Kaup .................... 73/864.44 |
| 4,567,214 A | | 1/1986 | Ilardo |
| 4,731,267 A | | 3/1988 | Makus et al. |
| 5,094,892 A | * | 3/1992 | Kayihan ................... 427/440 |
| 5,169,687 A | * | 12/1992 | Sunol ...................... 427/297 |
| 5,910,275 A | | 6/1999 | Hausdorf et al. |
| 5,910,555 A | * | 6/1999 | Ueda et al. ................. 528/34 |
| 5,985,372 A | | 11/1999 | Saka et al. |
| 6,040,057 A | | 3/2000 | Slimak et al. |
| 6,296,939 B1 | | 10/2001 | Kunze et al. |
| 6,608,129 B1 | * | 8/2003 | Koloski et al. ............. 524/403 |
| 7,303,654 B2 | | 12/2007 | Tokarz et al. |
| 7,364,795 B2 | | 4/2008 | Daly et al. |
| 7,404,918 B1 | | 7/2008 | Hejna et al. |
| 7,842,162 B1 | | 11/2010 | Lvov et al. |
| 8,951,611 B2 | * | 2/2015 | Lee .................... B05D 3/12 |
| 2005/0255251 A1 | | 11/2005 | Hodge et al. |
| 2007/0089846 A1 | | 4/2007 | Kim |
| 2009/0280344 A1 | | 11/2009 | Gothe et al. |
| 2010/0233245 A1 | | 9/2010 | Narayana |
| 2010/0239679 A1 | | 9/2010 | Greene et al. |

FOREIGN PATENT DOCUMENTS

| | | | |
|---|---|---|---|
| EP | 0934819 A1 | | 8/1999 |
| EP | 0934819 | * | 11/1999 |
| EP | 2199046 A1 | | 6/2010 |
| WO | WO 96/27483 A1 | | 9/1996 |
| WO | WO 97/26868 A1 | | 7/1997 |
| WO | WO2010/133548 A2 | | 11/2010 |

OTHER PUBLICATIONS

International Search Report and Written Opinion of PCT/US2011/044660 dated Dec. 12, 2011.
Agricultural Research for Development, Annual Report: CIRAD 2007; Borates and vegetable oils-promising wood preservatives, http://www.cirad.fr/en/publications-resources/science-for-all/rapports-annuels/cirad-2007 [printed from internet Sep. 2, 2010).
Tecnaro, ARBO Form, Engineering—Ethics—Aesthetics; www.tecnaro.de/english/arboform.htm (printed from internet Dec. 9, 2010).
Science Daily, Impregnating Plastics With Carbon Dioxide, http://www.sciencedaily.com/releases/2011/01/110103110206.htm (printed from internet Dec. 19, 2011).
Gemili, Preparation and Characterization of Antimicrobial Polymeric Films for Food Packaging Applications, A Thesis Submitted to the Graduate School of Engineering and Science of Izmir Institute of Technology in Partial Fulfillment of the Requirements for the Degree of Master of Science in Chemical Engineering (Jul. 2007), pp. 1-69.
Heeres et al., Supercritical carbon dioxide dissolves in potato starch and its derivatives (Dec. 7, 2010 ), www.4spepro.org/view.php?source=003401-2010-11-17.
Heiden et al., Nanotechnology: A Novel Approach to Prevent Biocide Leaching (Presentation Abstract), National Center for Environmental Research (Dec. 12, 2008), www.epa.gov/ncer/publications/workshop/10_26_05/abstracts.heiden.html.

(Continued)

*Primary Examiner* — Leszek Kiliman
(74) *Attorney, Agent, or Firm* — Pepper Hamilton LLP (57) ABSTRACT

A method of treating wood including providing wood having an outer layer, the outer layer including an acetylated wood cell wall; and applying a supercritical fluid mixture to the outer layer to form a treated wood, in which the supercritical fluid mixture includes a silicate precursor dissolved in a supercritical fluid, and in which the silicate precursor is attached to the acetylated wood cell wall in the treated wood is described. A glass fortified wood composition having: an acetylated wood cell wall; and a silicate precursor including a long chain alkyl group, in which the long chain alkyl group of the silicate precursor is embedded into the acetylated wood cell wall. A kit for treating wood is described including a silicate precursor; a supercritical fluid; and a catalyst capable of facilitating the formation of Si—O—Si linkages. The silicate precursor may be dissolved in the supercritical fluid.

23 Claims, 4 Drawing Sheets

(56) References Cited

OTHER PUBLICATIONS

Hong, Identification, Design and Synthesis of Oxygenated Hydrocarbon-Based $CO_2$-Soluble Polymers for Chemical and Petroleum Engineering Applications, Submitted to the Graduate Faculty of School of Engineering in partial fulfillment of the requirements for the degree of Doctor of Philosophy, University of Pittsburgh (2006).

Kenawy et al., The Chemistry and Applications of Antimicrobial Polymers: A State-of-the-Art Review, *Bio Macromolecules* (May 2007), published by the American Chemical Society, 8(5):1359-1384.

Lyon et al., Development of boron/linseed oil combined treatment as a low-toxic wood protection. Evaluation of boron fixation and resistance to termites according to Japanese and European standards, Conference in Taipei, Taiwan, Oct. 29-Nov. 2, 2007.

Matsunaga et al., A novel method of acetylation of wood using supercritical carbon dioxide, *Journal of Wood Science* (2010), 56(4):293-298 (Abstract).

Ni et al., Synthesis and Characterization of Hierarchically Porous Silica with Poplar Tissue as Template with Assistance of Supercritical $CO_2$, *BioResources* (2008), 3(2):461-476.

Smolander, Potential Nanotechnology Applications in Food Packaging, International Forum on Emerging Technologies in Food Processing, University of Illinois, Sep. 23-25, 2009.

\* cited by examiner

COMPOSITIONS AND METHODS FOR MAKING GLASS FORTIFIED WOOD

CLAIM OF PRIORITY

This application is a national phase application under 35 U.S.C. §371 of International Application No. PCT/US2011/044660, filed Jul. 20, 2011, which is incorporated herein by reference in its entirety.

BACKGROUND

Wood is inherently porous, and therefore has a very high inner surface area. Thus, deterioration of wood properties can occur via microbial or fungal activities on the inner surface of pores. The pore channels in the wood effectively absorb water through capillary action and the absorbed water can further affect the inner structure of wood. The moist conditions provide ideal living conditions for microbes and fungi. Accordingly, there is a need for effective wood preservation.

Glass fortified wood (glass wood) is lumber that has gone through a process that intermixes a non-toxic sodium silicate (water glass) based formula throughout the wood fibers. With glass encapsulating the wood fibers, the lumber becomes harder, its strength is increased and it is protected from fire, rot and insect damage. Glass wood can be used for in-ground contact applications and in-water applications. Furthermore, glass wood can be a Class A fire retardant.

However, the application of glass wood in areas such as furniture manufacture, in which light weight is required, is severely limited. In current methods of making glass fortified wood, the dehydration reaction of silica precursors is very difficult to control causing the silicon dioxide barrier to form indiscriminately both on the wood surface and in the wood pore resulting in a very heavy glass wood. Furthermore, the presence of high amount of abrasive silicon dioxide in the treated wood does not allow for the wood to be recycled for other uses. Accordingly, there is a need for a lightweight glass coating for wood which does not use high amounts of abrasive silicon dioxide filler.

SUMMARY

Some embodiments described below provide for a method of treating wood that includes providing wood having an outer layer with an acetylated wood cell wall, and applying a supercritical fluid mixture to the outer layer to form a treated wood. In some embodiments, the supercritical fluid mixture includes at least one silicate precursor dissolved in at least one supercritical fluid. In some embodiments, the silicate precursor may be attached to the acetylated wood cell wall in the treated wood.

In some embodiments, a glass fortified wood composition may be obtained by a method that includes providing wood having an outer layer with an acetylated wood cell wall and applying a supercritical fluid mixture to the outer layer to form a treated wood. In some embodiments, the supercritical fluid mixture may include at least one silicate precursor dissolved in at least one supercritical fluid. In some embodiments, the silicate precursor may be attached to the acetylated wood cell wall in the treated wood.

In some embodiments, a glass fortified wood composition may have an acetylated wood cell wall and a silicate precursor including a long chain alkyl group, in which the long chain alkyl group of the silicate precursor is embedded into the acetylated wood cell wall.

Some embodiments provide for a kit for treating wood including at least one silicate precursor, at least one supercritical fluid, and at least one catalyst capable of facilitating the formation of Si—O—Si linkages. In some embodiments, the silicate precursor may be dissolved in the supercritical fluid.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part of this document. In the drawings, similar symbols typically identify similar components, unless the context dictates otherwise. The illustrative embodiments described in the detailed description, drawings, and claims are not meant to be limiting. Other embodiments may be used, and other changes may be made, without departing from the spirit or scope of the subject matter presented in this document. It will be readily understood that the aspects of the present disclosure, as generally described in this document, and illustrated in the Figures, can be arranged, substituted, combined, separated, and designed in a wide variety of different configurations, all of which are explicitly contemplated to be within the scope of this disclosure.

Figure 1:
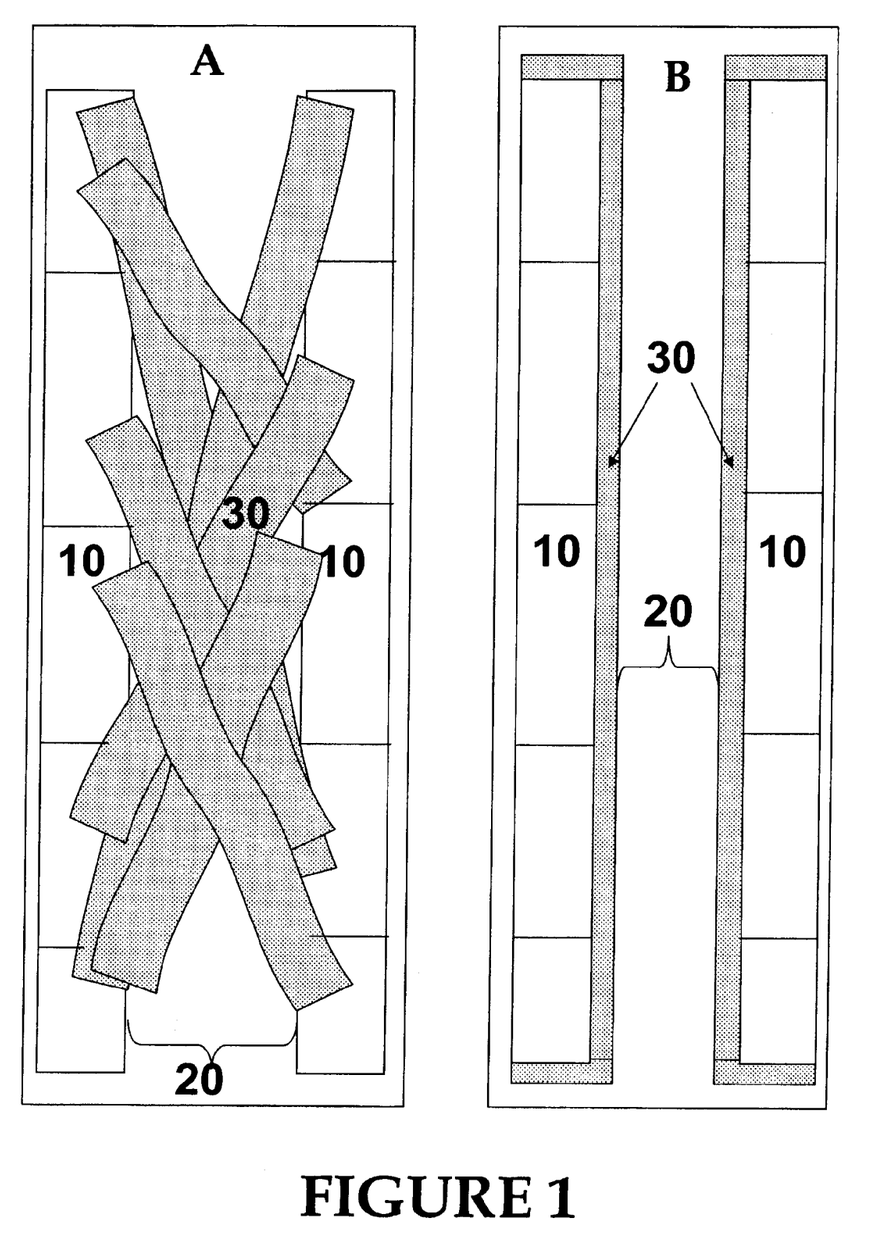
FIG. 1 illustrates (A) a conventional glass wood; (B) a glass fortified wood of an embodiment described in this document.

Some embodiments are directed to methods and compositions for making a glass fortified wood composition. A thin protective silicon dioxide ($SiO_2$) barrier on the wood cell walls may accomplish the fire retardant and the rot/insect resistant properties without the need to fill the wood pores with a high amount of glass formula. For example, FIG. 1, Part A shows conventional glass wood where the silicon dioxide layer 30 enters and fills the wood pore 20 and imperfectly coats the wood. On the other hand, FIG. 1, Part B illustrates a glass fortified wood of an embodiment described below where a thin silicon dioxide barrier 30 coats the wood cell walls 10 and acts as a barrier to protect the wood, without clogging the pore 20. Furthermore, the presence of a thin protective layer may allow the post-modification of the treated wood for various purposes without the use of excessive silicon dioxide abrasive filler, allowing the wood to be recycled.

The difficulty of forming a thin silicon dioxide barrier 30 evenly on the wood cell walls lies in controlling the nucleation and condensation of silica precursors. In untreated wood, nucleation may occur both in the aqueous medium and on the cellulose fibers indiscriminatingly. Accordingly, as shown in Part A of FIG. 1, silicon dioxide barrier 30 formation occurs both on the wood cell walls 10 and in the wood pore 20. Although the wood cell walls 10 may contain fibers with hydroxyl groups, the chemical composition of wood significantly differs among wood species and the hydroxyl groups in the fibers may not be evenly distributed. For example, without limitation, a lignin-rich portion of the wood will not be easily coated by silicon dioxide.

The formation of silicon dioxide may be guided with the proper nucleation sites. If the wood cell walls 10 are designed or the reaction is designed in a way to facilitate the silicon dioxide condensation only on the wood cell wall 10, then, as shown in Part B of FIG. 1, the wood cell wall 10, not the wood pore 20, will be the preferred site of silicon dioxide barrier 30 formation.

Figure 2:
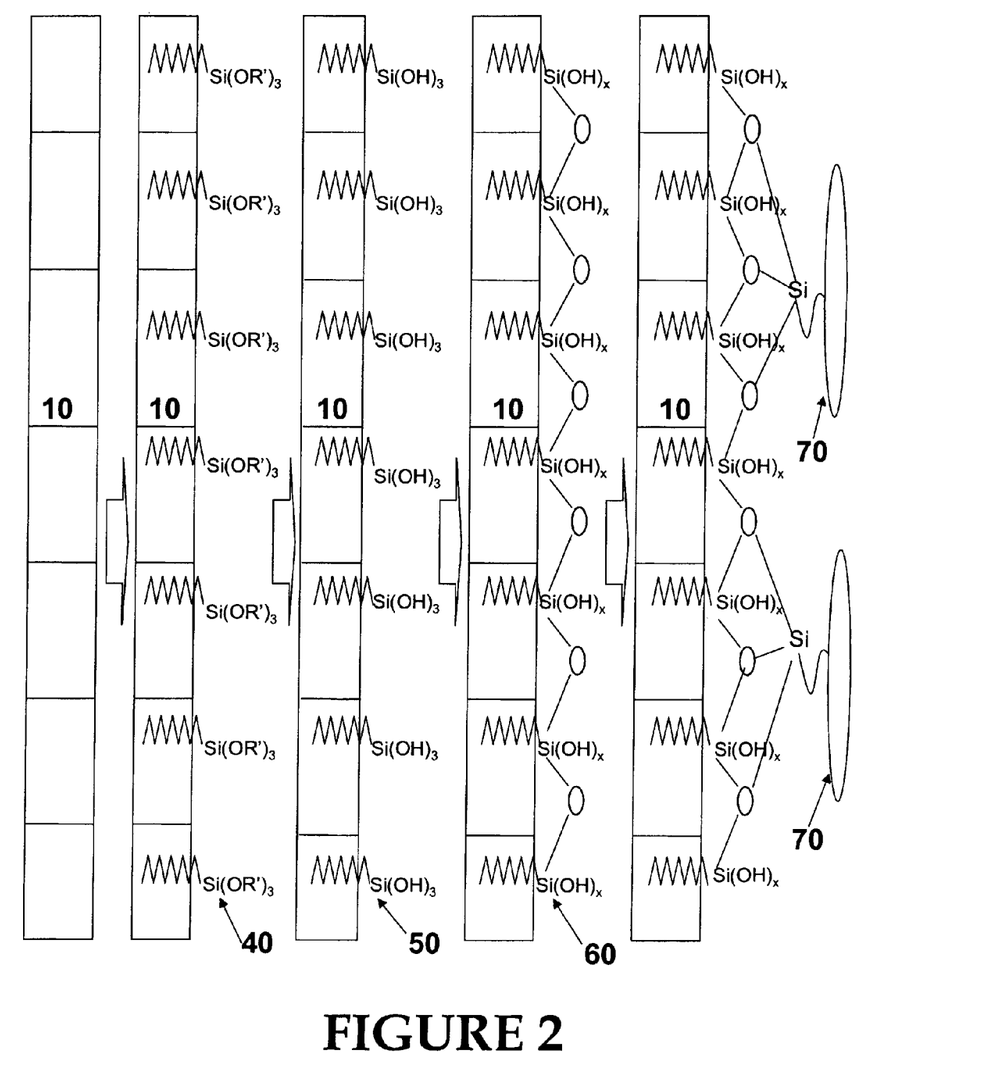
FIG. 2 illustrates wood at different stages of a method according to an embodiment described in this document.

Some embodiments include methods of treating wood. Referring to FIG. 2, in some embodiments, a silicate precursor 40 may be attached to a wood cell wall 10. The silicate precursor may optionally be hydrolyzed to form a hydrolyzed silicate precursor 50. The hydrolyzed silicate precursor 50 may then optionally be crosslinked to form an inorganic oxide surface 60. Optionally, a wood preservative 70 may then be attached to the inorganic oxide surface 60.

Figure 3:
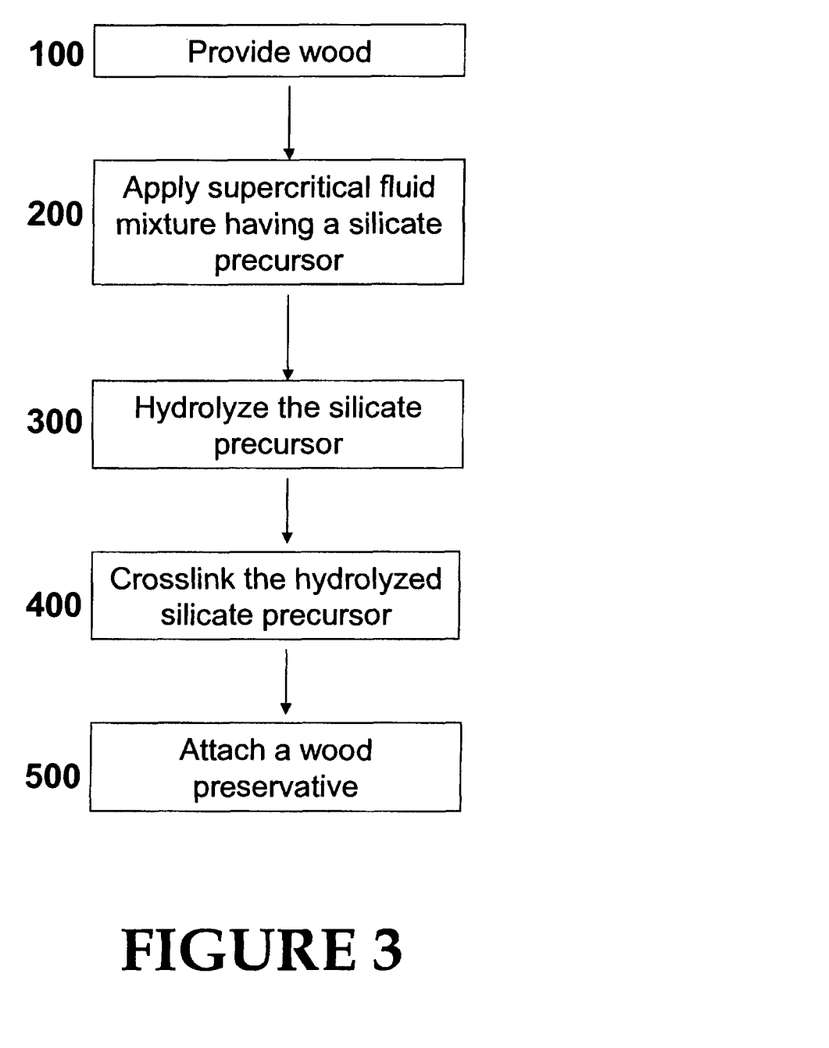
FIG. 3 shows a flow diagram of an exemplary method according to an embodiment described in this document.

Referring now to FIG. 3, in some embodiments, a method of treating wood includes providing wood having an outer layer with an acetylated wood cell wall (100) and applying a supercritical fluid mixture to the outer layer (200). In some embodiments, the method of treating wood may further include contacting a wood cell wall with acetic anhydride to form the acetylated wood cell wall. In some embodiments, the supercritical fluid mixture includes a silicate precursor dissolved in a supercritical fluid. The supercritical fluid in the supercritical fluid mixture may carry the silicate precursor into the acetylated wood cell wall and may leave these precursors embedded into the wood cell wall before exiting. In some embodiments, applying the supercritical fluid embeds a long chain alkyl group of the silicate precursor into the wood cell wall. In some embodiments, the silicate precursor is attached to the acetylated wood cell wall.

In some embodiments, referring to FIG. 3, the method may further include hydrolyzing the treated wood to form a hydrolyzed silicate precursor (300). The hydrolysis of the silicate precursors presents $Si(OH)_3$ functional groups on the wood cell walls. In some embodiments, the $Si(OH)_3$ groups are evenly distributed on the wood cell wall. Such evenly distributed $Si(OH)_3$ groups may promote homogenous condensation of further $Si(OH)_x$ groups. In some embodiments, the method further includes crosslinking the hydrolyzed silicate precursor to form an inorganic oxide surface (400). In some embodiments, crosslinking the hydrolyzed silicate precursor includes dehydrating the silicate precursors. Dehydration of the $Si(OH)_x$ groups may lead to a thin even coating of a silicon dioxide barrier on the wood cell wall. In some embodiments, the inorganic oxide surface may act as a preferred site for Si—O bond formation. In some embodiments, the method further includes attaching a wood preservative to the inorganic oxide surface (500). The wood preservative may act as a barrier against, for example, water, microbes, fungi and insects.

Some embodiments include methods designed to expose evenly distributed $Si(OH)_x$ groups on the wood cells for the formation of a thin silica layer on the wood cell walls. Exemplary benefits of the treated wood prepared by such methods may include light weight, recyclability, and the ability to easily modify the glass fortified wood cell wall post-formation. Exemplary benefits also may include an arsenic and chromium free wood preservation method, which makes the method and resultant wood environmentally friendly.

One skilled in the art will appreciate that, for this and other processes and methods disclosed in this document, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Some embodiments describe a glass fortified wood composition obtained using methods described in this disclosure. Referring to FIG. 2, in some embodiments, a glass fortified wood composition includes a wood having a wood cell wall 10, and a silicate precursor 40 including a long chain alkyl group, in which the long chain of the silicate precursor 40 is embedded into the wood cell wall 10. In some embodiments, the silicate precursor is a hydrolyzed silicate precursor 50. In some embodiments, a glass fortified wood composition includes a wood having a wood cell wall 10, and a silicon dioxide barrier 30 having a long chain alkyl group embedded into the acetylated cell wall. In some embodiments, the wood cell wall 10 is acetylated. In some embodiments, the glass fortified composition further includes a wood preservative 70.

In some embodiments, the glass fortified wood includes a silicon dioxide surface which is capable of melting and sealing the wood cell walls completely in case of a fire. Such a silicon dioxide surface may be made by slightly modifying the supercritical fluid mixture of embodiments described in this disclosure.

Silicate Precursor

In some embodiments, the silicate precursor is non-polar. In some embodiments, the silicate precursor is a long chain alkyl silicon alkoxide. In some embodiments, the silicate precursor has the formula R—Si(OR')$_3$, in which R is a long chain alkyl group having the formula $C_nH_{2n+1}$ in which n is any integer from 1 to 50, and R' is a hydrogen or alkyl group. In some embodiments, in the formula $C_nH_{2n+1}$, n may be any integer from 1 to 50, from 1 to 40, from 1 to 30, from 1 to 20, from 1 to 10, from 5 to 50, from 5 to 40, from 5 to 30, from 5 to 20, or from 5 to 10. Specific examples may include 5, 8, 10, 12, 14, 16, 18, 20, 22, 24, 26, 28, 30, 34, and ranges between any two of these values. In some embodiments, the long chain alkyl group may be a hexadecyl, octadecenyl, dodecyl, tetradecyl, octadecyl, or docosenoic. In some embodiments, the long chain alkyl group may be an unsaturated alkyl group. As used in this document, the term "unsaturated alkyl group" refers to a straight or branched alkyl group containing at least 1 carbon-carbon double bond and having from 8 to 34 carbon atoms. For example, in some embodiments, the unsaturated alkyl group may refer to an oleyl group, palmitoleyl group, elaidyl group, linoleyl group, elaidolinoleyl group, linolenyl group, ricinoleyl group, erucyl group, or a combination thereof.

In some embodiments, R' is hydrogen or an alkyl group with up to six carbons. In some embodiments, R' may be a straight chain alkyl group. In some embodiments, R' may be a methyl, ethyl, propyl, butyl, pentyl, hexyl group, or a combination thereof.

In some embodiments, the silicate precursor may include tetrachlorosilane ($SiCl_4$), silicon tetraacetate ($C_8H_{12}O_8Si$), silicic acid ($[SiO_x(OH)_{4-2x}]_n$; where n=1-2000, and x=0-2), hexadecyl triethoxysilane ($C_{16}H_{33}Si(OC_2H_5)_3$), 2-aminoethyl triethoxysilane ($H_2NCH_2CH_2Si(OC_2H_5)_3$), tetraethoxy orthosilicate ($Si(OC_2H_5)_4$), 3-aminopropyl triethoxysilane ($H_2N(CH_2)_3Si(OC_2H_5)_3$) or a combination thereof. In some embodiments, the silicate precursor may include metasilicic acid, orthosilicic acid, disilicic acid, pyrosilicic acid, or a combination thereof. Various silicate precursor compounds have one chemical formula, but may be represented by different names. For example, silicon tetraacetate and tetraacetoxysilane both represent the same chemical $C_8H_{12}O_8Si$.

In some embodiments, the wood cell wall may be acetylated. The presence of acetyl groups on the wood cell wall may promote the interaction of the cellulose with the long chain alkyl group of the silicate precursor. This may lead to the silicate precursor molecule being oriented to expose the polar groups, such as, without limitation, $Si(OR)_3$ groups, on the wood cell wall.

Supercritical Fluid

The supercritical fluid may be any supercritical fluid. In some embodiments, the supercritical fluid may be any supercritical fluid that can permeate a wood cell wall. The solubility of the supercritical fluid in the acetylated wood cell wall allows the silicate precursors to easily permeate and embed into the wood cell wall.

In some embodiments, the supercritical fluid may include supercritical carbon dioxide, supercritical water, supercritical methane, supercritical ethane, supercritical propane, supercritical ethylene, supercritical propylene, supercritical methanol, supercritical ethanol, supercritical acetone, supercritical noble gas, supercritical argon, supercritical xenon, supercritical krypton, supercritical helium, supercritical neon, supercritical radon, or a combination thereof. In some embodiments, the supercritical fluid may include supercritical carbon dioxide.

Supercritical fluids exist at temperatures and pressures above their "critical point". For example, argon has a critical point of 4.87 MPa and −122.4 degrees Celsius. Carbon dioxide has a critical point of 7.39 MPa and 31.1 degrees Celsius. Tables of critical points and associated phase diagrams are readily available for a wide array of fluids.

Wood Preservative

The wood preservative used in embodiments may be waterproofing agents, biocides, antibiotics, fungicides, mildewcides, insecticides, preservatives, antimicrobial agents, tetraethyl orthosilicate, low melting glass-forming sol, dialkylsilicon halide compounds or a combination thereof. In some embodiments, the wood preservative may include a silicon alkoxide to bind to the inorganic oxide surface.

In some embodiments, the wood preservative may be attached to the inorganic oxide surface using a single-step reaction. For example, in some embodiments, attachment of a wood preservative agent, such as, without limitation, a biocidal agent or a water-proofing agent, equipped with silicon alkoxides, may be accomplished through a single condensation reaction. In some embodiments, the water-proofing agent may include an alkyl group or a siloxane group.

Blocking water with a wood preservative may reduce mold, fungi, bacteria and insect attack in the same way that the water-excluding effects of exhaustive acetylation of wood. In some embodiments, the wood preservative may include arsenic, chromium, copper, micronized copper, tung oil, linseed oil, chromated copper arsenate (CCA), alkaline copper quaternary (ACQ), copper azole, bis-(N-cyclohexyl-diazeniumdioxy)-copper (copper HDO; CuHDO), copper chromate, copper citrate, acid copper chromate, ammoniacal copper zinc arsenate (ACZA), pentachlorophenol, creosote, borate, sodium silicate, potassium silicate, permethrin, bifenthrin, deltamethrin, or a combination thereof.

In some embodiments, the wood preservative may include a silicon alkoxide, a silane group, a silanol group or a combination thereof. In some embodiments, the wood preservative may be an alkyl triethoxysilane, a triethyoxysilane bonded to a siloxane polymer, or a combination thereof.

The treated wood of embodiments may be advantageous in that it may minimize the amount of wood preservatives needed to coat the wood because of the evenly coated inorganic oxide surface.

Kits

Figure 4:
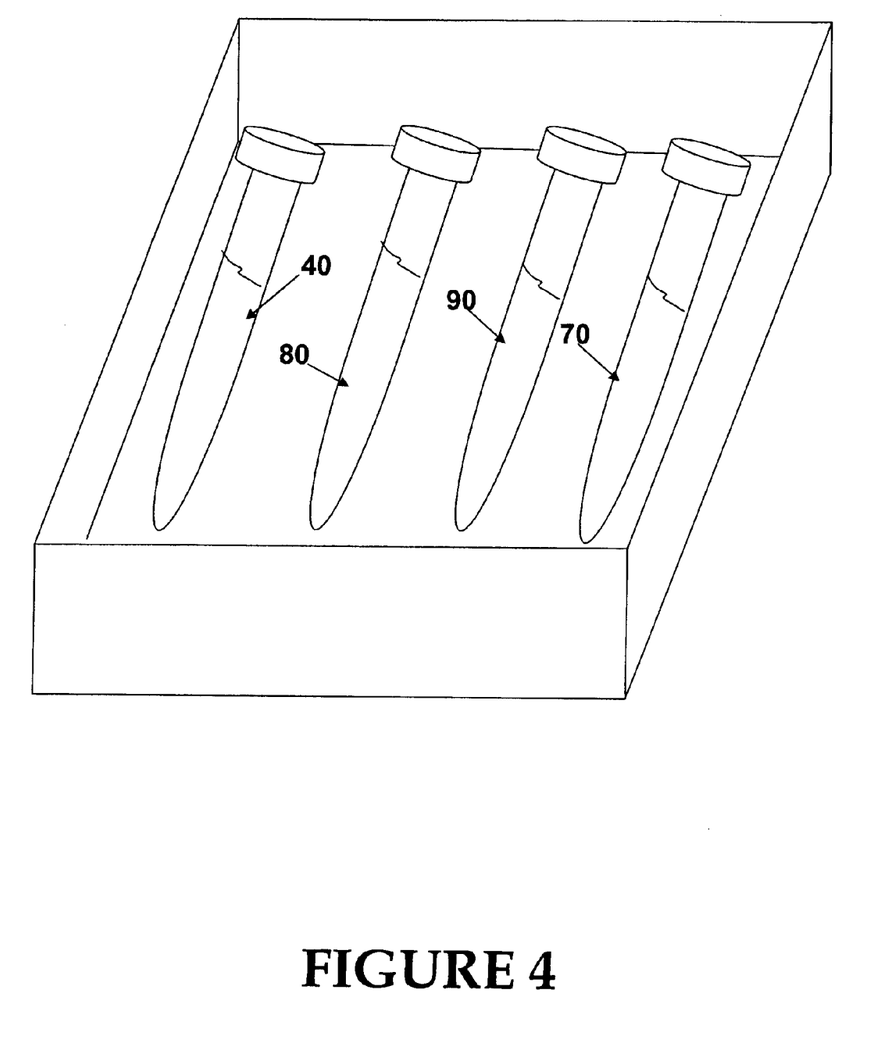
FIG. 4 illustrates a kit according to an embodiment described herein.

Some embodiments include a kit for treating wood. For example, in some embodiments, a kit may contain reagents and components for producing a glass fortified wood. In some embodiments, referring to FIG. 4, the kit may include a silicate precursor 40 and a supercritical fluid 80. In some embodiments, the kit may include a supercritical fluid mixture including a silicate precursor 40 dissolved in a supercritical fluid 80. In some embodiments, the kit for treating wood may further include a catalyst 90 to facilitate the formation of Si—O—Si linkages. In some embodiments, the catalyst 90 is an acid or base catalyst. In some embodiments, the catalyst 90 is ammonia ($NH_3$). In some embodiments, the supercritical fluid 80 may be supercritical carbon dioxide. In some embodiments, the kit may further include a wood preservative 70.

In some embodiments, the kit may further include a housing. The housing of such kits may be formed from a relatively rigid material (such as a metal or rigid plastic case or box, or a wall-mounted cabinet) or a flexible pouch (made, for example, from a cloth or foam-type material). In some embodiments, the housing may have one or more chambers for holding the kit's contents. In some embodiments, the housing may be a relatively rigid case having a main body and a lid. The main body may have an interior configured to receive, hold, and maintain the components of the kit. The kits may include one or more containers such as, without limitation, vials, test tubes or bottles, with each container containing a separate component for carrying out a processing or preparing step according to the present disclosure.

The kit may further include an instruction sheet that outlines the procedural steps of the methods, and will follow substantially the same procedures as described in this disclosure. The instruction information may be in a computer readable media containing machine-readable instructions that, when executed using a computer, cause the display of a real or virtual procedure of making a glass fortified wood of disclosed embodiments. The instructions for practicing the subject methods are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging), etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

In addition to the components noted above, the kits may also include one or more control samples and reagents, e.g., two or more control samples. Such control samples may take any form, e.g., negative and positive control samples for use in analyzing the glass coating on the wood, etc. Any convenient control sample may be employed in the subject kits. In some embodiments, the control sample may comprise sulfuric acid. Without wishing to be bound by theory, it is believed that sulfuric acid converts carbohydrates such as cellulose into carbon even at low temperature, thereby turning the wood black. On the other hand, a completely coated wood by silica wall would not be affected by sulfuric acid and the wood would not be blackened by sulfuric acid treatment.

In some embodiments, the weight of the wood may be used to analyze the glass coating on the wood. The weight of the wood may be slightly changed by silica treatment. Accordingly, the relative weight change may be used to analyze glass coated wood in relation to untreated wood.

In some embodiments, wood treated using the methods described herein may have a distinctive wood cell wall structure, including, without limitation, a thin silica layer on the wood surface. In some embodiments, the thin silica layer may be on the inner and outer wood surface. In some embodiments, a cross-sectional view of a cut wood piece visualized by a scanning electron microscope may be used to analyze a wood block treated using methods described herein. In some embodiments, elemental analysis may be used to analyze a wood block treated using methods described herein. Other similar methods may also be used.

Improved Protection

The treated wood can have improved protection against a variety of harmful effects such as fire, rot, and insect damage. The improved property can be measured against a similar sample of wood that has not been so treated. The improved protection can be measured in a variety of manners, such as measuring percent reduction in damage, or measuring time to reach a certain amount of damage.

For example, the treated wood can exhibit at least about 10% less damage than a similar sample of untreated wood. In other examples, the treated wood can exhibit at least about 20%, at least about 40%, at least about 60%, at least about 80%, at least about 90%, at least about 95%, at least about 96%, at least about 97%, at least about 98%, or at least about 99% less damage than a similar sample of untreated wood. In an idealized case, the treated wood exhibits 100% less damage than a similar sample of untreated wood (that is, the treated wood is completely protected against the harmful effect). For example, treated and untreated wood can be exposed to a similar number of insects for a certain amount of time. At the end of the insect attack, the degree of damage can be measured and compared.

Alternatively, the treated wood can take more time to reach a certain amount of damage. For example, the treated wood can take about 1.1 times the amount of time as the untreated wood to reach a certain amount of damage. In other examples, the treated wood can take about 1.2, about 1.3, about 1.4, about 1.5, about 1.6, about 1.7, about 1.8, about 1.9, about 2, about 3, about 4, about 5, about 6, about 7, about 8, about 9, about 10, and so on times the amount of time as the untreated wood to reach a certain amount of damage. For example, treated and untreated wood can be placed in a moist environment and monitored until visible rot is detected. The amount of time for the treated and untreated wood can be measured and compared.

Embodiments illustrating the method and materials used may be further understood by reference to the following non-limiting examples.

EXAMPLE 1

Supercritical $CO_2$-Assisted Silicate Coating of Sugi Heartwood

Insertion of $RSi(OR')_3$ into acetylated wood cell wall: A dried acetylated wood block (30 cm×10 cm×2 cm) of Sugi (*Cryptomeria japonica* D. Don) heartwood will be treated with 1 g of hexadecyl triethoxysilane ($C_{16}H_{33}Si(OC_2H_5)_3$) in supercritical $CO_2$ (about 60° C. to about 100° C., 10-12 MPa) for 10 minutes. The fluid with silicate precursors can be recovered and recycled to treat another wood block.

Hydrolysis of $RSi(OR')_3$ into acetylated wood cell wall: The acetylated wood block will be placed in an oven with a humidity of 80% and a temperature of about 60° C. to about 100° C. for 1 hour and will be dried.

Formation of thin $SiO_2$ barrier on the wood wall: The wood block and a mixture of 1 mL tetraethoxy orthosilicate ("TEOS"; $Si(OEt)_4$) and 1 mL 40% ammonia water will be placed in supercritical $CO_2$ having a temperature at about 120° C. to about 130° C. and a pressure of about 10 to about 12 MPa. Once treated with supercritical $CO_2$, the wood will be dried to form a glass fortified wood which is water-proof and resistant to rot and insects.

EXAMPLE 2

Supercritical $H_2O$-Assisted Silicate Coating of Cedar Sapwood

A dried cedar sapwood block (30 cm×10 cm×2 cm) will be treated with 1.2 g of tetraacetyl orthosilicate ($C_8H_{12}O_8Si$) dissolved in supercritical water (about 60° C. to about 100° C., 10-12 MPa) for 10 minutes. The wood block will be placed in an oven with a humidity of 85% and a temperature of about 60° C. to about 100° C. for 1.2 hours and will be dried to form a glass fortified wood which is water-proof and resistant to rot and insects.

EXAMPLE 3

Supercritical $CO_2$-Assisted Silicate Coating of Pine Heartwood

A dried pine heartwood block will be placed in a mixture of 1 mL TEOS ($Si(OEt)_4$) and 0.1 g $H_2NCH_2CH_2Si(OEt)_3$ dissolved in supercritical $CO_2$ (about 120° C. to about 130° C., 10-12 MPa). The wood block will be placed in an oven with a humidity of 78% and a temperature of about 60° C. to about 100° C. for 1.1 hours and will be dried to form a glass fortified wood which is water-proof and resistant to rot and insects.

EXAMPLE 4

Supercritical Methane-Assisted Silicate Coating of Maple Sapwood

A dried maple sapwood block (30 cm×10 cm×2 cm) will be treated with 1.0 g of $C_{16}H_{33}Si(OC_2H_5)_3$ dissolved in supercritical methane (about 40° C. to about 90° C., 10-12 MPa) for 8 minutes. The wood block will be placed in an oven with a humidity of 75% and a temperature of about 40° C. to about 90° C. for 0.9 hours and will be dried to form a glass fortified wood which is water-proof and resistant to rot and insects. The glass fortified wood may be further functionalized with ammoniacal copper zinc arsenate by a condensation reaction. To functionalize the wood preservative onto the glass fortified wood, the ammoniacal copper zinc arsenate will be dissolved in a solvent, such as a supercritical fluid. The resulting solution will be pressure treated to the glass fortified wood block.

EXAMPLE 5

Supercritical Water-Assisted Silicate Coating of Hickory Heartwood

A dried hickory heartwood block will be placed in a mixture of 1.0 g $C_{16}H_{33}Si(OC_2H_5)$ and 0.1 g $H_2NCH_2CH_2Si$ (OEt)$_3$ dissolved in supercritical water (about 120° C. to about 130° C., 10-12 MPa). The wood block will be placed in an oven with a humidity of 78% and a temperature of about 60° C. to about 100° C. for 1.1 hours and will be dried to form a glass fortified wood which is water-proof and resistant to rot and insects. The glass fortified wood will be further functionalized with sodium silicate by a condensation reaction. To functionalize the wood preservative onto the glass fortified wood, the sodium silicate will be dissolved in a solvent, such as a supercritical fluid. The resulting solution will be pressure treated to the glass fortified wood block.

EXAMPLE 6

A Kit for Treating Wood

A kit for treating wood will be made having a test tube containing tetraethoxy orthosilicate dissolved in supercritical CO$_2$. The kit will further include a test tube containing NH$_3$ to act as a catalyst to facilitate the formation of Si—O—Si linkages. The kit will also include a test tube containing wood preservative such as a low melting glass-forming sol. The kit may be housed in a The kit may be used in accordance with any methods described in this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following clai

The invention claimed is:

1. A method of treating wood, the method comprising:
   providing wood having an outer layer, the outer layer comprising an acetylated wood cell wall;
   applying a supercritical fluid mixture to the outer layer to form a treated wood, wherein the supercritical fluid mixture comprises a silicate precursor dissolved in a supercritical fluid, and wherein the applying attaches the silicate precursor to the acetylated wood cell wall;
   hydrolyzing the treated wood to form a hydrolyzed silicate precursor; and crosslinking the hydrolyzed silicate precursor to form an inorganic oxide surface.

2. The method of claim 1, wherein the acetylated wood cell wall is prepared by contacting a wood cell wall in the outer layer with acetic anhydride.

3. The method of claim 1, wherein applying the supercritical fluid mixture comprises applying the supercritical fluid mixture comprising a non-polar silicate precursor.

4. The method of claim 1, wherein applying the supercritical fluid mixture comprises applying the supercritical fluid mixture comprising a long chain alkyl silicon alkoxide silicate precursor.

5. The method of claim 1, wherein applying the supercritical fluid mixture comprises applying the supercritical fluid mixture comprising a silicate precursor having a formula $RSi(OR')_3$;
wherein R is a long chain alkyl group having the formula $C_nH_{2n+1}$, wherein n can be any integer from 1 to 50; and R' is hydrogen, methyl, ethyl, propyl, butyl, pentyl, hexyl, or a combination thereof.

6. The method of claim 5, wherein applying the supercritical fluid mixture comprises applying the supercritical fluid mixture comprising the silicate precursor having the formula $RSi(OR')_3$ where
R is a hexadecyl group, octadecenyl group, dodecyl group, tetradecyl group, octadecyl group, docosenoic group, palmitoleyl group, elaidyl group, linoleyl group, elaidolinoleyl group, linolenyl group, ricinoleyl group, erucyl group, or a combination thereof.

7. The method of claim 1, wherein applying the supercritical fluid mixture comprises applying the supercritical fluid mixture comprising at least one silicate precursor selected from tetrachlorosilane ($SiCl_4$), silicon tetraacetate ($C_8H_{12}O_8Si$), silicic acid ($[SiO_x(OH)_{4-2x}]_n$), hexadecyl triethoxysilane($C_{16}H_{33}Si(OC_2H_5)_3$), 2-aminoethyl triethoxysilane ($H_2NCH_2CH_2Si(OC_2H_5)_3$), tetraethyl orthosilicate ($Si(OC_2H_5)_4$), and a combination thereof.

8. The method of claim 1, wherein applying the supercritical fluid mixture embeds a long chain alkyl group of the silicate precursor into the wood cell wall.

9. The method of claim 1, wherein applying the supercritical fluid mixture comprises applying at least one supercritical fluid mixture selected from supercritical carbon dioxide, supercritical water, supercritical methane, supercritical ethane, supercritical propane, supercritical ethylene, supercritical propylene, supercritical methanol, supercritical ethanol, supercritical acetone, supercritical noble gas, supercritical argon, supercritical xenon, supercritical krypton, supercritical helium, supercritical neon, supercritical radon, and combinations thereof 10. The method of claim 1, wherein applying the supercritical fluid mixture comprises applying supercritical carbon dioxide.

11. The method of claim 1, further comprising attaching a wood preservative to the inorganic oxide surface.

12. The method of claim 11, wherein attaching the wood preservative comprises attaching at least one wood preservative selected from water-proofing agents, biocides, antibiotics, fungicides, mildewcides, insecticides, preservatives, antimicrobial agents, tetraethyl orthosilicate, low melting glass-forming sol, dialkylsilicon halide compounds, and combinations thereof 13. The method of claim 11, wherein attaching the wood preservative comprises attaching a silicon alkoxide wood preservative.

14. A glass fortified wood composition obtained by a method comprising:
providing wood having an outer layer, the outer layer comprising an acetylated wood cell wall;
applying a supercritical fluid mixture to the outer layer to form a treated wood, wherein the supercritical fluid mixture comprises a silicate precursor dissolved in a supercritical fluid, and wherein the silicate precursor is attached to the acetylated wood cell wall in the treated wood;
hydrolyzing the treated wood to form a hydrolyzed silicate precursor; and
crosslinking the hydrolyzed silicate precursor to form an inorganic oxide surface.

15. A glass fortified wood composition comprising:
an acetylated wood cell wall; and a silicate precursor comprising a long chain alkyl group, wherein the long chain alkyl group of the silicate precursor is embedded into the acetylated wood cell wall.

16. The composition of claim 15, wherein the silicate precursor is a long chain alkyl silicon alkoxide.

17. The composition of claim 15, wherein the silicate precursor has the formula $RSi(OR')_3$;
wherein R is a long chain alkyl group having the formula $C_nH_{2n+1}$, wherein n can be any integer from 1 to 50; R' is hydrogen, methyl, ethyl, propyl, butyl, pentyl, hexyl, or a combination thereof.

18. The composition of claim 17, wherein R is a hexadecyl group, octadecenyl group, dodecyl group, tetradecyl group, octadecyl group, docosenoic group, palmitoleyl group, elaidyl group, linoleyl group, elaidolinoleyl group, linolenyl group, ricinoleyl group, erucyl group, or a combination thereof 19. The composition of claim 15, wherein the silicate precursor is tetrachlorosilane ($SiCl_4$), silicon tetraacetate ($C_8H_{12}O_8Si$), silicic acid ($[SiO_x(OH)_{4-2x}]_n$), hexadecyl triethoxysilane ($C_{16}H_{33}Si(OC_2H_5)_3$), 2-aminoethyl triethoxysilane ($H_2NCH_2CH_2Si(OC_2H_5)_3$), tetraethyl orthosilicate ($Si(OC_2H_5)_4$), or a combination thereof.

20. The composition of claim 15, further comprising a wood preservative attached to the silicate precursor.

21. The composition of claim 20, wherein the wood preservative is water-proofing agents, biocides, antibiotics, fungicides, mildewcides, insecticides, preservatives, antimicrobial agents, tetraethyl orthosilicate, low melting glassforming sol, dialkylsilicon halide compounds, or combinations thereof.

22. The glass fortified wood composition of claim 14, wherein applying the supercritical fluid mixture comprises applying the supercritical fluid mixture comprising a silicate precursor having a formula $RSi(OR')_3$
wherein R is a long chain alkyl group having the formula $C_nH_{2n+1}$, wherein n can be any integer from 1 to 50; and R' is hydrogen, methyl, ethyl, propyl, butyl, pentyl, hexyl, or a combination thereof.

23. The glass fortified wood composition of claim 14, wherein applying the supercritical fluid mixture embeds a long chain alkyl group of the silicate precursor into the wood cell wall.

* * * * *